(12) United States Patent
Sasaki et al.

(10) Patent No.: US 9,674,909 B2
(45) Date of Patent: Jun. 6, 2017

(54) DRIVING CIRCUIT FOR LIGHT-EMITTING ELEMENT WITH BURST DIMMING CONTROL

(71) Applicant: ROHM CO., LTD., Ukyo-Ku, Kyoto (JP)

(72) Inventors: Yoshikazu Sasaki, Kyoto (JP); Shunsuke Saito, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 14/955,624

(22) Filed: Dec. 1, 2015

(65) Prior Publication Data

US 2016/0088694 A1 Mar. 24, 2016

Related U.S. Application Data

(62) Division of application No. 13/992,069, filed as application No. PCT/JP2011/006739 on Dec. 1, 2011, now Pat. No. 9,232,579.

(30) Foreign Application Priority Data

Dec. 8, 2010 (JP) ................................. 2010-273461

(51) Int. Cl.
G09G 3/32 (2016.01)
H05B 33/08 (2006.01)
(Continued)

(52) U.S. Cl.
CPC ....... *H05B 33/0818* (2013.01); *G02F 1/1336* (2013.01); *G09G 3/342* (2013.01);
(Continued)

(58) Field of Classification Search
CPC ... G02F 1/133601; G02F 2001/133612; H05B 33/0815
(Continued)

(56) References Cited

U.S. PATENT DOCUMENTS

2002/0030477 A1 3/2002 Daio
2005/0237039 A1* 10/2005 Kikuchi ................. G11C 5/147
323/282
(Continued)

FOREIGN PATENT DOCUMENTS

JP 2008077892 A 4/2008
JP 2009261158 A 11/2009
JP 2010027362 A 2/2010

OTHER PUBLICATIONS

International Preliminary Report on Patentability for International Application No. PCT/JP2011/006739; Maling Date: Jun. 12, 2013.
(Continued)

*Primary Examiner* — Jonathan Blancha
(74) *Attorney, Agent, or Firm* — Cantor Colburn LLP

(57) ABSTRACT

A detection resistor is arranged on a path of an LED string. A controller generates a gate pulse signal having a duty ratio adjusted such that the voltage drop at the detection resistor matches a predetermined reference voltage. Furthermore, the controller receives a dimming control signal which indicates the duty ratio of the burst dimming operation, and generates a corresponding burst dimming pulse. According to the gate pulse signal, the first driver drives an output circuit configured to generate a driving voltage. A second driver switches a path of a driving current between connection and disconnection according to the burst dimming pulse. A duty ratio detection unit controls the frequency of the gate pulse signal according to the duty ratio indicated by the dimming control signal.

9 Claims, 7 Drawing Sheets

(51) Int. Cl.
  *G02F 1/1335* (2006.01)
  *G09G 3/34* (2006.01)
(52) U.S. Cl.
  CPC ..... *H05B 33/0815* (2013.01); *H05B 33/0824* (2013.01); *H05B 33/0851* (2013.01); *G02F 2001/133601* (2013.01); *G02F 2001/133612* (2013.01); *G09G 2320/064* (2013.01); *G09G 2330/02* (2013.01)
(58) Field of Classification Search
  USPC .......................................... 345/82; 315/224
  See application file for complete search history.

(56) References Cited

U.S. PATENT DOCUMENTS

| 2009/0072748 | A1 | 3/2009 | Feng |
| 2009/0267530 | A1 | 10/2009 | Yang et al. |
| 2011/0062998 | A1* | 3/2011 | Mitsubori ............ G11C 7/1051 327/152 |
| 2011/0227627 | A1 | 9/2011 | Liu et al. |
| 2012/0075544 | A1 | 3/2012 | Sasaki |
| 2012/0286686 | A1 | 11/2012 | Watanabe et al. |
| 2013/0328602 | A1* | 12/2013 | Kibune ................ H03K 5/1565 327/156 |

OTHER PUBLICATIONS

International Search Report for International Application No. PCT/JP2011/006739; Date of Mailing: Mar. 6, 2012, with English Translation.

U.S. Non-Final Office Action corresponding to U.S. Appl. No. 13/992,069; Issued May 7, 2015.

Written Opinion of the International Searching Authority for International Application No. PCT/JP2011/006739; Date of Mailing: Mar. 6, 2012, with English Translation.

* cited by examiner

DRIVING CIRCUIT FOR LIGHT-EMITTING ELEMENT WITH BURST DIMMING CONTROL

CROSS REFERENCE TO RELATED APPLICATIONS

The present application is a divisional application of U.S. patent application Ser. No. 13/992,069, filed on Jun. 6, 2013, the entire contents of which are incorporated herein by reference. The 13/992,069 application is the U.S. National Stage of Application No. PCT/JP2011/006739, filed on 1 Dec. 2011. Priority under 35 U.S.C. §119(a) and 35 U.S.C. §365(b) is claimed from Japanese Application No. 2010-273461, filed 8 Dec. 2010, the disclosure of which is also incorporated herein by reference.

BACKGROUND OF THE INVENTION

Field of the Invention

The present invention relates to a driving technique for a light-emitting element, and particularly to a dimming technique for such a light-emitting element.

Description of the Related Art

In recent years, as a backlight of a liquid crystal panel or as an illumination device, a light-emitting apparatus is employed, which is configured using a light-emitting element such as an LED (light-emitting diode) or the like. FIG. 1 is a circuit diagram which shows an example configuration of a light-emitting apparatus according to a comparison technique. A light-emitting apparatus 1003 includes an LED string 6, and a switching power supply 1004.

The LED string 6 includes multiple LEDs connected in series. The switching power supply 1004 is configured to step up an input voltage Vin input to an input terminal P1 so as to output a driving voltage Vout to one end of the LED string 6 connected to an output terminal P2.

The switching power supply 1004 includes an output circuit 102 and a control IC 1100. The output circuit 102 includes an inductor L1, a switching transistor M1, a rectifier diode D1, and an output capacitor C1. The control IC 1100 adjusts the driving voltage Vout by controlling the on/off duty ratio of the switching transistor M1.

A PWM dimming switch (transistor) M2 and a current detection resistor R1 for current detection are arranged on a path of the LED string 6. A controller 1010 generates a pulse-width modulated (PWM) burst dimming pulse G2 having a duty ratio that is controlled according to an external dimming control signal PWMDIM such that it matches the target luminance level. A driver DR2 performs switching of the PWM dimming switch M2 according to the burst dimming pulse G2.

A voltage drop (detection voltage) $V_{R1}$, which is proportional to the driving current $I_{DRV}$ that flows through the LED string 6, occurs at the detection resistor R1. An error amplifier EA1 amplifies the difference between the detection voltage $V_{R1}$ and a reference voltage $V_{REF}$ so as to generate a feedback voltage $V_{F3}$. The controller 1010 generates a gate pulse signal G1 that is subjected to pulse modulation according to the feedback voltage $V_{FB}$. A driver DR1 performs switching of the switching transistor M1 according to the gate pulse signal G1.

With such a configuration, feedback control is performed such that the relation $I_{DRV}=V_{REF}/R1$ holds true, thereby allowing the LED string 6 to emit light with a luminance level that corresponds to the reference voltage $V_{REF}$ (current dimming).

Furthermore, the light-emitting time of the LED string 6 is controlled according to the on/off duty ratio of the PWM dimming switch M2, thereby adjusting the effective luminance (PWM dimming or burst dimming).

RELATED ART DOCUMENTS

Patent Documents

[Patent document 1]
Japanese Patent Application Laid Open No. 2009-261158
The contrast ratio of a liquid crystal panel can be improved by dynamically controlling the luminance of the LED string 6. That is to say, by reducing the minimum luminance of the LED string 6, the contrast ratio of the liquid crystal panel can be improved.

SUMMARY OF THE INVENTION

The present invention has been made in view of such a situation. Accordingly, it is an exemplary purpose of an embodiment of the present invention to provide a driving circuit which is capable of driving an LED string at a luminance level that is as reduced as possible.

An embodiment of the present invention relates to a driving circuit configured to supply a driving voltage and a driving current to a light-emitting element. The driving circuit comprises: a detection resistor arranged on a path of the light-emitting element; a controller configured to generate a gate pulse signal having a duty ratio that is adjusted such that voltage drop across the detection resistor matches a predetermined reference voltage, to receive a dimming control signal which indicates the duty ratio of the burst dimming, and to generate a burst dimming pulse according to the dimming control signal; a first driver configured to drive, according to the gate pulse signal, a switching power supply configured to generate the driving voltage; a second driver configured to switch the state according to the burst dimming pulse between a state in which a path of the driving current is connected and a state in which the path of the driving current is disconnected; and a duty ratio detection unit configured to control the frequency of the gate pulse signal according to the duty ratio indicated by the dimming control signal.

Another embodiment of the present invention also relates to a driving circuit. The driving circuit comprises: a current source arranged on a path of the light-emitting element; a controller configured to generate a gate pulse signal having a duty ratio that is adjusted such that voltage drop across the current source matches a predetermined reference voltage, to receive a dimming control signal which indicates the duty ratio of a burst dimming, and to generate a burst dimming pulse according to the dimming control signal; a first driver configured to drive, according to the gate pulse signal, a switching power supply configured to generate the driving voltage; a second driver configured to switch the state according to the burst dimming pulse between a state in which a path of the driving current is connected and a state in which the path of the driving current is disconnected; and a duty ratio detection unit configured to control the frequency of the gate pulse signal according to the duty ratio indicated by the dimming control signal.

With such embodiments, by changing the switching frequency of the switching transistor of the switching power supply according to the duty ratio of the burst dimming operation, such an arrangement is capable of controlling the luminance of the light-emitting element according to the duty ratio even in a range in which the duty ratio is small.

Also, the duty ratio detection unit may be configured to raise the frequency of the gate pulse signal as the duty ratio indicated by the dimming control signal becomes lower.

Yet another embodiment of the present invention relates to a light-emitting apparatus. The light-emitting apparatus comprises: a light-emitting element; and a driving circuit according to any one of the aforementioned embodiments, configured to drive the light-emitting element.

Yet another embodiment of the present invention relates to an electronic device. The electronic device comprises: a liquid crystal panel; and the aforementioned light-emitting apparatus arranged as a backlight of the liquid crystal panel.

It should be noted that any combination of the aforementioned components may be made, and any component of the present invention or any manifestation thereof may be mutually substituted between a method, apparatus, system, and so forth, which are effective as an embodiment of the present invention.

BRIEF DESCRIPTION OF THE DRAWINGS

Embodiments will now be described, by way of example, only, with reference to the accompanying drawings which are meant to be exemplary, not limiting, and wherein like elements are numbered alike in several Figures, in which.

DETAILED DESCRIPTION OF THE INVENTION

Figure 1:
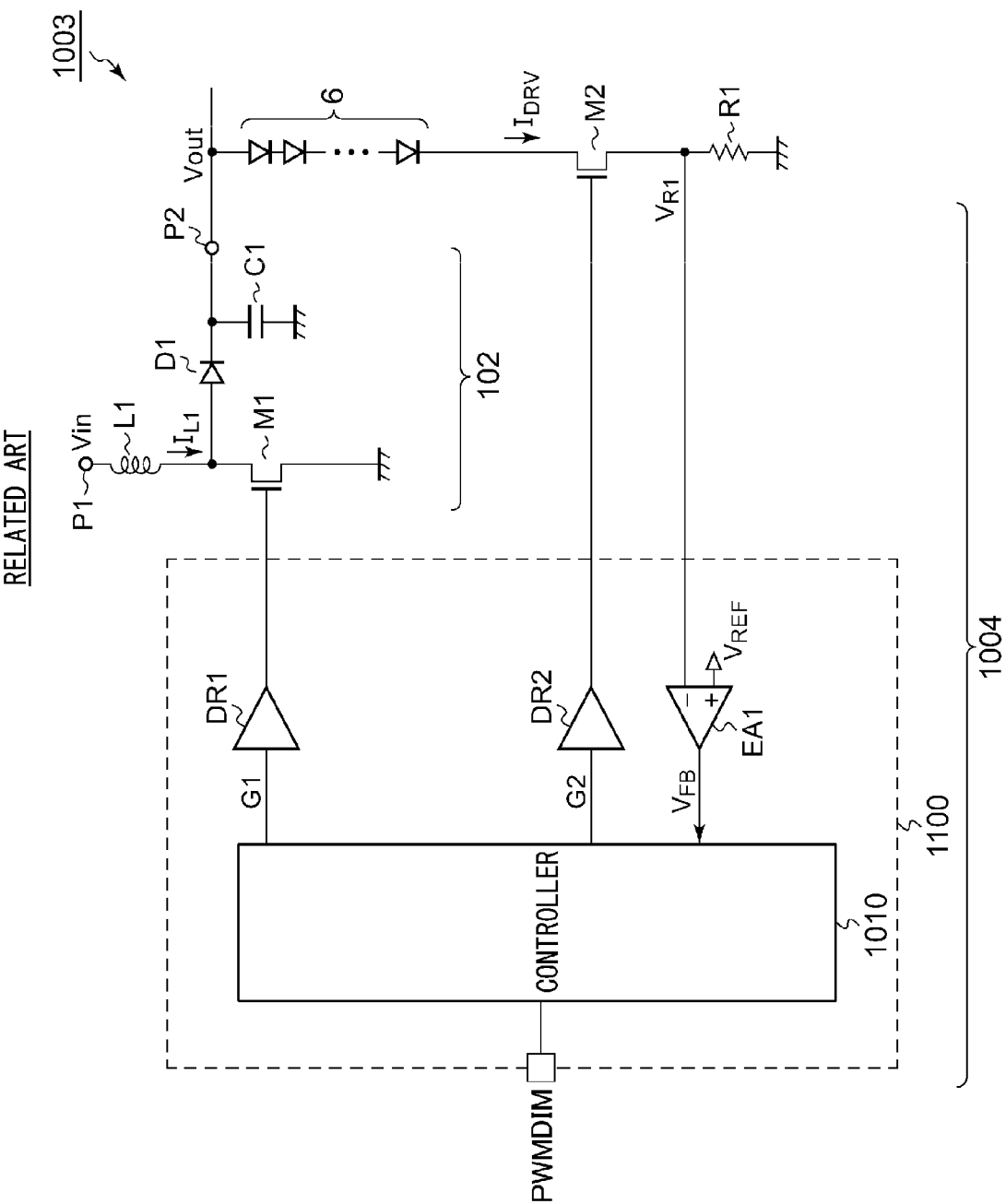
FIG. 1 is a circuit diagram which shows an example configuration of a light-emitting apparatus according to a comparison technique.

Description will be made below regarding preferred embodiments according to the present invention with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

The present inventors have investigated techniques for reducing the minimum luminance of the light-emitting apparatus 1003 shown in FIG. 1. There are two approaches for reducing the minimum luminance. In the first approach, the driving current $I_{DRV}$ is reduced by means of current dimming. In the second approach, the duty ratio of the burst dimming is reduced.

With the first approach, the driving current $I_{DRV}$ can be reduced by reducing the reference voltage $V_{REF}$. However, the input voltage range of the error amplifier EA1 configured to receive the reference voltage $V_{REF}$ and the detection voltage $V_{R1}$ has a lower limit. Thus, this approach has a limitation.

Figure 2A:
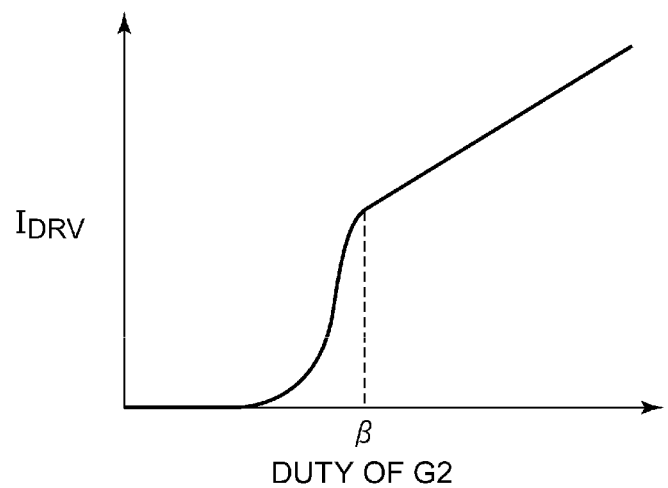
FIG. 2A is a diagram which shows the relation between the duty ratio of a burst dimming pulse and a driving current in the light-emitting apparatus shown in FIG. 1.

In order to solve such a problem, the second approach has been investigated. FIG. 2A is a diagram which shows the relation between the duty ratio of the burst dimming pulse G2 and the driving current $I_{DRV}$ in the light-emitting apparatus 1003 shown in FIG. 1. Over a duty ratio range of the burst dimming pulse G2 that is greater than a certain lower limit β (0.04%), the driving current $I_{DRV}$ changes according to the duty ratio. However, when the duty ratio becomes smaller than the lower limit β (0.04%), the driving current $I_{DRV}$ sharply drops. That is to say, by reducing the lower limit β, such an arrangement is capable of further reducing the minimum luminance by means of the second approach.

The present inventors have investigated the reasons why there is a lower limit β on the duty ratio, and a method for reducing the lower limit β. It should be noted that the following investigation has been uniquely made by the present inventors, and is by no means within the scope of common and general knowledge of those skilled in this art.

Figure 2B:
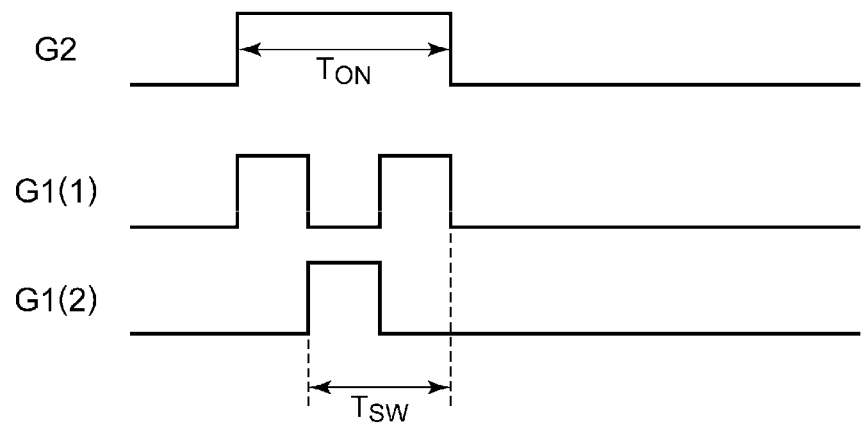
FIG. 2B is a waveform diagram which shows the burst dimming pulse and a gate pulse signal in the light-emitting apparatus shown in FIG. 1.

In the burst dimming operation, in the off period of the PWM dimming switch M2, the feedback signal is disconnected, which stops the switching of the switching transistor M1. In the on period $T_{ON}$ of the PWM dimming switch M2, the feedback operation is effectively performed according to the detection voltage $V_{R1}$. In this period, the duty ratio of the switching transistor M1 is adjusted, thereby stabilizing the output voltage Vout. Accordingly, as the pulse width (duty ratio) of the burst dimming pulse G2 is reduced, i.e., as the on period is reduced, the period in which the feedback operation is effectively performed becomes shorter. FIG. 2B is a waveform diagram which shows the burst dimming pulse G2 and the gate pulse signal G1 in the light-emitting apparatus 1003 shown in FIG. 1.

When the pulse width (on period $T_{ON}$) of the burst dimming pulse G2 approaches the period (switching period $T_{SW}$) of the gate pulse signal G1, the number of pulses of the gate pulse signal G1 included in the on period $T_{ON}$ of the burst dimming pulse G2 fluctuates depending on the phase of the gate pulse signal G1. That is to say, at a certain phase G1(1) of the gate pulse signal G1, there are two pulses of the gate pulse signal G1 in the on period $T_{ON}$. On the other hand, at another phase G1(1) of the gate pulse signal G1, there is only a single pulse in the on period $T_{ON}$. Such fluctuation leads to a reduction in the energy stored in the inductor L1, resulting in a problem in that the output voltage Vout cannot be maintained at its target value. The present inventors have reached such an idea which explains the characteristics shown in FIG. 2A.

[First Embodiment]

Figure 3:
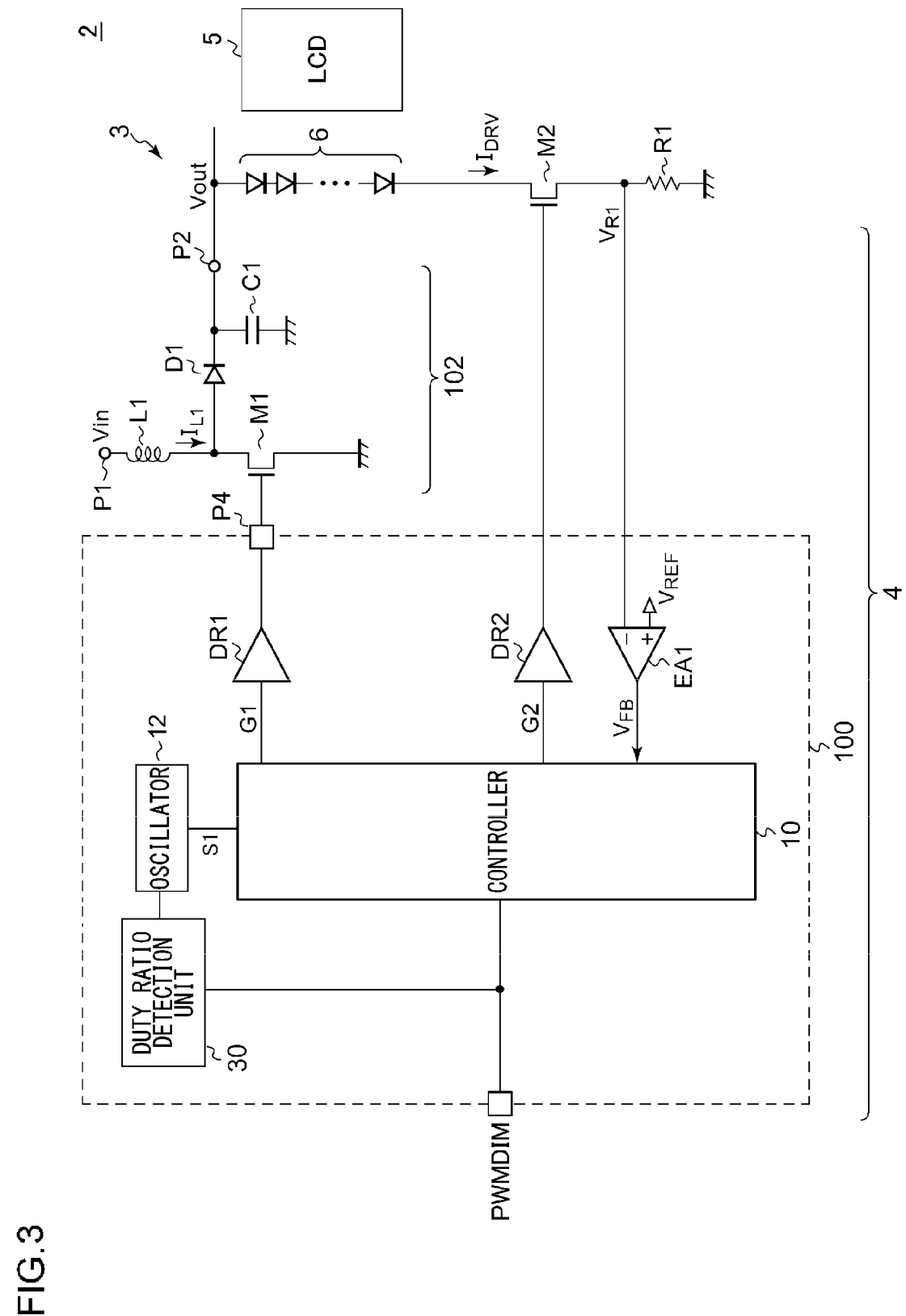
FIG. 3 is a circuit diagram which shows a configuration of a light-emitting apparatus according to a first embodiment.

FIG. 3 is a circuit diagram which shows a configuration of a light-emitting apparatus 3 according to a first embodiment. An electronic device 2 is configured as a battery-driven device such as a laptop PC, a digital still camera, a digital video camera, a cellular phone terminal, a PDA (Personal Digital Assistant), or the like, and includes a light-emitting apparatus 3 and an LCD panel (Liquid Crystal Panel) 5. The light-emitting apparatus 3 is provided as a backlight of the LCD panel 5.

The light-emitting apparatus 3 includes an LED string 6 configured as a light-emitting element and a driving circuit 4 for the LED string 6.

The LED string 6 includes multiple LEDs connected in series. The driving circuit 4 includes a step-up DC/DC converter, and is configured to step up the input voltage (e.g., battery voltage) Vin input via an input terminal P1 so as to output an output voltage (driving voltage) Vout via an output terminal P2. One end (anode) of the LED string 6 is connected to the output terminal P2.

The driving circuit 4 includes a control IC 100 and an output circuit 102. The output circuit 102 includes an inductor L1, a rectifier diode D1, a switching transistor M1, and an output capacitor Cl. The output circuit 102 has a typical topology, and accordingly, description thereof will be omitted.

A switching terminal P4 of the control IC 100 is connected to the gate of the switching transistor M1. The control IC 100 adjusts the on/off duty ratio of the switching transistor M1 by means of feedback control so as to provide the output voltage Vout required to allow the LED string LED 6 to emit light, and so as to maintain the light emission of the LED string 6 at a target luminance. It should be noted that the switching transistor M1 may be configured as a built-in component of the control IC 100.

A PWM dimming switch M2 is arranged on a path of the LED string 6, and specifically between the cathode of the LED string 6 and the ground terminal. By adjusting the on/off ratio (duty ratio) of the PWM dimming switch M2, such an arrangement is capable of adjusting the ratio between the on time and the off time of the LED string 6, thereby adjusting the effective luminance level of the LED string 6. Such an operation will be referred to as "burst dimming (PWM dimming)". A dimming control signal PWMDIM is input to a PWMDIM terminal. The dimming control signal PWMDIM is a signal which indicates the duty ratio of the burst dimming, and is configured as a pulse width modulated pulse signal. The controller 10 is configured to generate a burst dimming signal G2 according to the dimming control signal PWMDIM. With a simplest configuration, the dimming control signal PWMDIM itself may be employed as the burst dimming pulse G2.

The detection resistor R1 is arranged on a path of the LED 6, and specifically between the cathode of the LED string 6 and the ground terminal.

The oscillator 12 is configured as a variable oscillator. The controller 10 is configured to generate a gate pulse signal G1 using a cyclic signal S1 generated by the oscillator 12. That is to say, the frequency of the gate pulse signal G1 corresponds to the oscillation frequency of the oscillator 12. The cyclic signal S1 may be configured as a pulse signal, or otherwise a cyclic signal having a sawtooth waveform or triangle waveform. The kind of the cyclic signal S1 should be designed as appropriate according to the configuration of the controller 10.

The error amplifier EA1 is configured to amplify the difference between the voltage drop $V_{R1}$ that occurs at the detection resistor R1 and a reference voltage $V_{REF}$ so as to generate an error voltage $V_{FB}$. The controller 10 is configured to receive the error voltage $V_{FB}$ and the cyclic signal S1, and to generate the gate pulse signal G1 having a duty ratio adjusted such that the voltage drop $V_{R1}$ that occurs at the detection resistor R1 matches a control voltage $V_{DIM}$. The frequency of the gate pulse signal G1 corresponds to the frequency of the cyclic signal S1. A first driver DR1 is configured to drive the switching transistor M1 of the DC/DC converter according to the gate pulse signal G1.

A duty ratio detection unit 30 is configured to receive the dimming control signal PWMDIM, and to detect the duty ratio of the dimming control signal PWMDIM. Furthermore, the duty ratio detection unit 30 is configured to control the oscillation frequency of the oscillator 12 according to the duty ratio thus detected. When the duty ratio is large, the duty ratio detection unit 30 is configured to reduce the oscillation frequency of the oscillator 12, and when the duty ratio becomes small, the duty ratio detection unit 30 is configured to raise the oscillation frequency of the oscillator 12.

For example, when the duty ratio α thus detected is higher than a predetermined threshold TH, the duty ratio detection unit 30 sets the frequency of the oscillator 12 to a first value $f_1$. When the duty ratio α becomes lower than the predetermined threshold TH, the duty ratio detection unit 30 sets the frequency of the oscillator 12 to a second value $f_2$ that is higher than the first value $f_1$. The threshold value TH is preferably set to a value that is slightly higher than a lower limit β shown in FIG. 2.

Figure 4A:
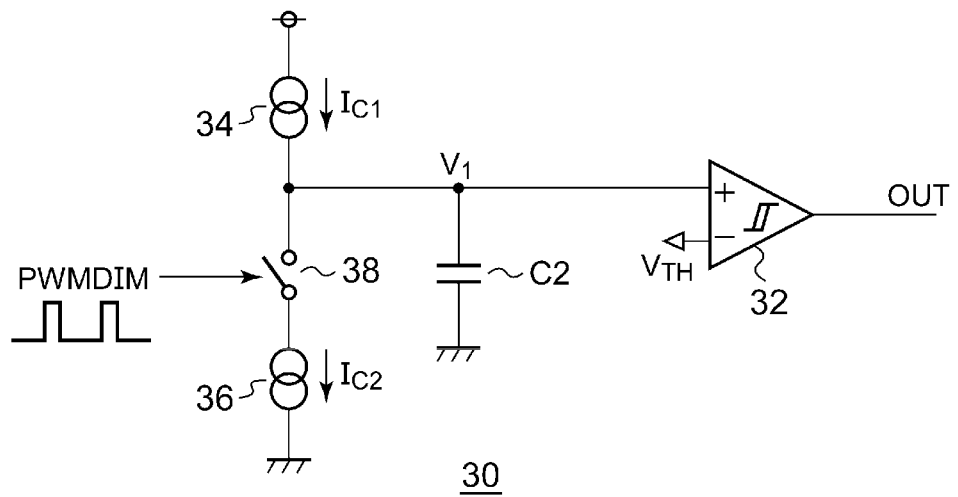
FIG. 4A is a circuit diagram which shows a first example configuration of a duty ratio detection unit shown in FIG. 3.

The above is the configuration of the driving circuit 4. Next, description will be made regarding an example configuration of the duty ratio detection unit 30. FIG. 4A is a circuit diagram which shows a first example configuration of the duty ratio detection unit 30 shown in FIG. 3. The duty ratio detection unit 30 includes a capacitor C2, a hysteresis comparator 32, a first current source 34, a second current source 36, and a switch 38.

The capacitor C2 is arranged such that one end thereof is grounded. The first current source 34 is configured to generate a first current $I_{C1}$ so as to charge the capacitor C2. The second current source 36 is configured to generate a second current $I_{C2}$ so as to discharge the capacitor C2. The switch 38 is a switch configured to disconnect and connect a path of the second current $I_{C2}$. The one/off state of the switch 38 is controlled according to the dimming control signal PWMDIM. The second current $I_{C2}$ is represented by the following Expression (1) using a constant K.

$$I_{C2} = K \times I_{C1} \qquad (1)$$

The hysteresis comparator 32 is configured to compare a voltage $V_1$ that occurs at the capacitor C2 with a predetermined threshold voltage $V_{TH}$. The threshold voltage $V_{TH}$ is determined according to the aforementioned threshold value TH. When the output of the hysteresis comparator 32 is low level, the threshold voltage $V_{TH}$ is set to a first value $V_{TH1}$. When the output of the hysteresis comparator 32 is high level, the threshold voltage $V_{TH}$ is set to a second value $V_{TH2}$ that is lower than the first value $V_{TH1}$. As an example, the first value $V_{TH1}$ and the second value $V_{TH2}$ are represented by the following Expressions.

$$V_{TH1}=V_{DD}\times\tfrac{2}{3}$$

$$V_{TH2}=V_{DD}\times\tfrac{1}{3}$$

The output OUT of the comparator 32 represents the comparison result between the duty ratio α of the dimming control signal PWMDIM and the threshold value. By employing such a hysteresis comparator, such an arrangement is capable of preventing the frequency of the gate pulse signal G1 from oscillating when the duty ratio α of the dimming control signal PWMDIM is in the vicinity of the threshold TH.

Figure 4B:
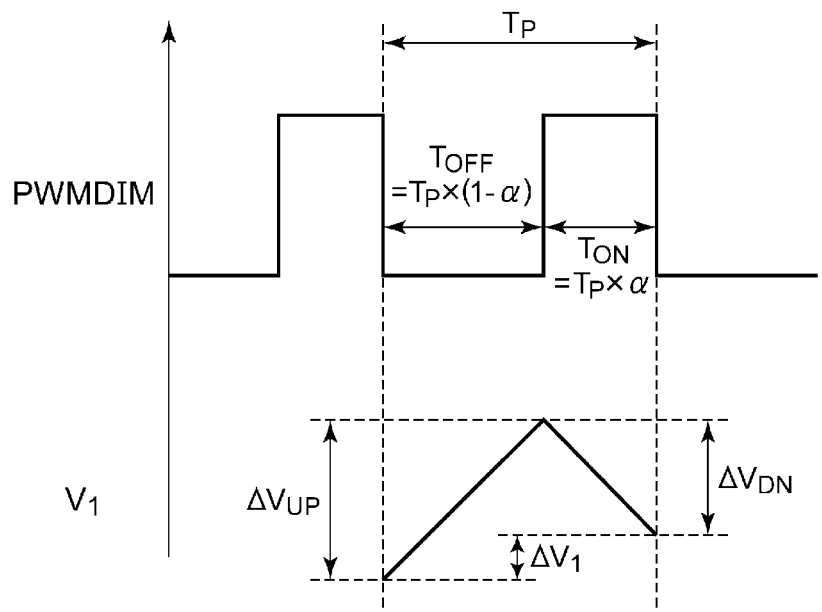
FIG. 4B is a waveform diagram which shows the operation of the duty ratio detection unit shown in FIG. 4A.

FIG. 4B is a waveform diagram which shows the operation of the duty ratio detection unit 30 shown in FIG. 4A. During a period in which the dimming control signal PWMDIM is low level, the switch 38 is turned off, thereby charging the capacitor C2 by means of the first current $I_{C1}$. As a result, the voltage $V_1$ at the capacitor C2 rises at a slope represented by $(I_{C1}/C2)$. With the duty ratio of the dimming control signal PWMDIM as α, and with the period thereof as $T_P$, the off period $T_{OFF}$ and the on period $T_{ON}$ are represented by the following Expressions (2a) and (2b), respectively.

$$T_{OFF}=T_P\times(1-\alpha) \quad (2a)$$

$$T_{ON}=T_P\times\alpha \quad (2b)$$

Thus, the increase in the voltage $V_1$ at the capacitor C2 for one off period $T_{OFF}$ is represented by the following Expression (3).

$$\Delta V_{UP}=I_{C1}/C2\times T_P\times(1-\alpha) \quad (3)$$

During a period in which the dimming control signal PWMDIM is high level, the switch 38 is turned on. In this state, the capacitor C2 is discharged by means of the current difference between the second current $I_{C2}$ and the first current $I_{C1}$, i.e., $(I_{C2}-I_{C1})=(K-1)\cdot I_{C1}$. As a result, the voltage $V_1$ at the capacitor C2 decreases with a slope represented by $(K-1)\cdot I_{C1}/C2$. Thus, the decrease in the voltage $V_1$ at the capacitor C2 for one on period $T_{ON}$ is represented by the following Expression (4).

$$\Delta V_{DN}=(K-1)\cdot I_{C1}/C2\times T_P\times\alpha \quad (4)$$

From Expressions (3) and (4), the amount of change in the voltage $V_1$ in one cycle is represented by $\Delta V=\Delta V_{UP}-\Delta V_{DN}=I_{C1}\times T_P/C2\times(1-K\cdot\alpha)$. Thus, when $K\times\alpha=1$, $\Delta V$ becomes zero. That is to say, the voltage $V_1$ is maintained at a constant value at a given level. When $\alpha<1/K$, the voltage $V_1$ increases, and when $\alpha>1/K$, the voltage $V_1$ decreases. That is to say, the threshold value TH used by the duty ratio detection unit 30 in the comparison with the duty ratio α of the dimming control signal PWMDIM is represented by $1/K$. For example, when K=20, judgment is made whether or not the duty ratio α is higher than 5%.

When the duty ratio α is maintained at a level that is higher than the threshold value TH=1/K, the voltage $V_1$ is maintained at zero. When the duty ratio α becomes lower than the threshold value 1/K in a state in which the voltage $V_1=0$ V, the number of cycles N required for the voltage $V_1$ to rise from 0 V up to the threshold voltage $V_{TH1}$ is represented by the following Expression (5).

$$N=V_{TH1}/\Delta V \quad (5)$$
$$=V_{TH1}/\{I_{C1}\times T_P/C2\times(1-K\cdot\alpha)\}$$
$$=2/3\cdot V_{DD}/\{I_{C1}\times T_P/C2\times(1-K\cdot\alpha)\}$$

For example, each parameter is determined such that, when K=20 and α=0, the required number of cycles N is set to 5.

That is to say, each parameter is determined such that the following Expression (6) holds true.

$$5=\tfrac{2}{3}\times V_{DD}/\{I_{C1}\times T_P/C2\}$$

$$V_{DD}/\{I_{C1}\times T_P/C2\}=15/2 \quad (6)$$

By substituting Expression (6) into Expression (5), the following Expression (7) is obtained.

$$N=5/(1-20\cdot\alpha) \quad (7)$$

Thus, the following relation Expressions are obtained.
When α=1%, N=6.25.
When α=2%, N=8.33.
When α=3%, N=8.33.
When α=4%, N=12.5.
When α=5%, N=25.

As the duty ratio α becomes large, such an arrangement requires an increased number of cycles N to detect a reduction in the duty ratio α. However, such an arrangement provides a sufficient detection speed for controlling the contrast of the liquid display panel.

Conversely, when the duty ratio α is maintained at a level that is lower than the threshold value 1/K, the voltage $V_1$ becomes equal to the power supply voltage $V_{DD}$. When the duty ratio α becomes higher than the threshold value 1/K in a state in which the voltage $V_1=V_{DD}$, the number of cycles N required for the voltage $V_1$ to drop from the power supply voltage $V_{DD}$ down to the threshold voltage $V_{TH2}(=V_{DD}/3)$ is represented by the following Expression (5).

$$N=(V_{DD}-V_{TH2})/\Delta V \quad (8)$$
$$=2/3\cdot V_{DD}/\{I_{C1}\times T_P/C2\times(1-K\cdot\alpha)\}$$

When α=1, by substituting Expression (6) into Expression (8), the Expression N=200/19 is obtained.

If it is assumed that the frequency of the dimming control signal PWMDIM is configured as a variable frequency having the maximum value $I_{PMAX}$, in such a case, the current $I_{C1}$ and the capacitance C2 may preferably be determined such that the relation expression $I_{C1}/C2=\tfrac{2}{15}\times V_{DD}/T_{PMAX}$ holds true. Such an arrangement allows the duty ratio to be detected over the possible frequency range. For example, when the dimming control signal PWMDIM is supplied in a range between 100 Hz and 500 Hz, the maximum value of the period $T_{PMAX}$ is 10 ms.

Figure 5:
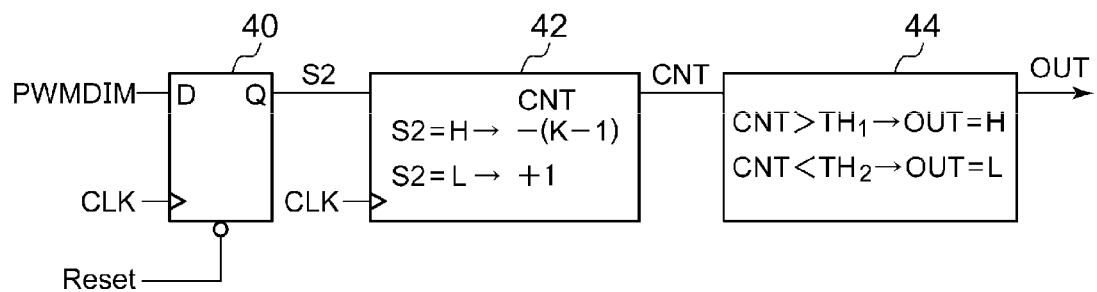
FIG. 5 is a circuit diagram which shows a second example configuration of the duty ratio detection unit shown in FIG. 3.

FIG. 5 is a circuit diagram which shows a second example configuration of the duty ratio detection unit 30 shown in FIG. 3. By means of digital signal processing, a duty ratio detection unit 30b provides an equivalent operation to that of the duty ratio detection unit 30a shown in FIG. 4A.

The duty ratio detection unit 30b includes a flip-flop 40, a counter 42, and a digital comparator 44. The flip-flop 40 latches the dimming control signal PWMDIM at a timing of each positive edge of the clock signal CLK. It should be noted that the flip-flop 40 may be omitted. When the signal S2 thus latched is high level, the counter 42 decrements (counts down) the count value CNT by (K−1). When the signal S2 thus latched is low level, the counter 42 increments (counts up) the count value CNT by 1.

The counter 42 corresponds to the first current source 34, the second current source 36, and the capacitor C2 shown in FIG. 4A. The count-down operation corresponds to the discharging operation shown in FIG. 4A, and the count-down operation corresponds to the charging operation shown in FIG. 4A. The count value CNT corresponds to the voltage $V_1$ shown in FIG. 4A. The frequency of the clock signal CLK is set to a value that is sufficiently higher than the frequency of the dimming control signal PWMDIM. In a case in which the dimming control signal PWMDIM is supplied in a frequency range between 100 Hz and 500 Hz, the frequency of the clock signal CLK is set to a value on the order of 100 kHz.

The digital comparator 44 corresponds to the hysteresis comparator 32 shown in FIG. 4A. When the count value CNT becomes greater than $TH_1$, the digital comparator 44 asserts (sets to high level) its output OUT. When the count value CNT becomes smaller than $TH_2$, the digital comparator 44 negates (sets to low level) the output OUT. That is to say, the output OUT of the digital comparator 44 represents the comparison result between the duty ratio α of the dimming control signal PWMDIM and the threshold value TH.

For example, in a case in which the digital comparator 44 has an upper limit MAX of the count value CNT of 1500, the threshold value $TH_1$ may be set to (⅔×MAX), i.e., 1000, and the threshold value $TH_2$ may be set to (⅓×MAX). i.e., 500. The upper limit MAX corresponds to $V_{DD}$.

The duty ratio detection unit 30b shown in FIG. 5 is capable of comparing the duty ratio α of the dimming control signal PWMDIM with the threshold value TH, in the same way as with the duty ratio detection unit 30a shown in FIG. 4A.

The above is the configuration of the driving circuit 4. Next, description will be made regarding the operation thereof. Description will be made returning to FIG. 3. When the light-emitting apparatus 3 operates normally, the driving current $I_{DRV}$ is stabilized to $I_{DRV}=V_{REF}/R1$ (current dimming).

With such an arrangement, the time ratio of a period in which the driving current $I_{DRV}$ flows through the LED string 6 is controlled according to the dimming control signal PWMDIM, thereby adjusting the average value of the driving current $I_{DRV}$, i.e., the effective luminance of the LED string 6 (burst dimming). With the duty ratio of the burst dimming pulse G2 as α, the average value $I_{DRV\_AVE}$ of the driving current $I_{DRV}$ is represented by $I_{DRV\_AVE}=V_{REF}/R1 \times \alpha$.

Figure 6A:
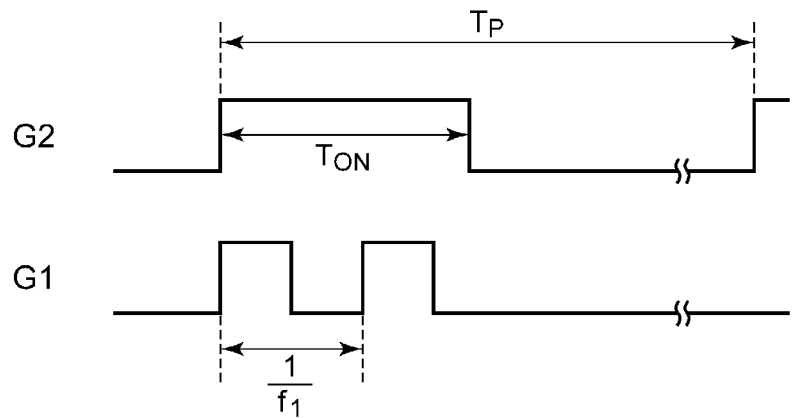
FIGS. 6A and 6B are waveform diagrams each showing the operation of the light-emitting apparatus shown in FIG. 3.
Figure 6B:
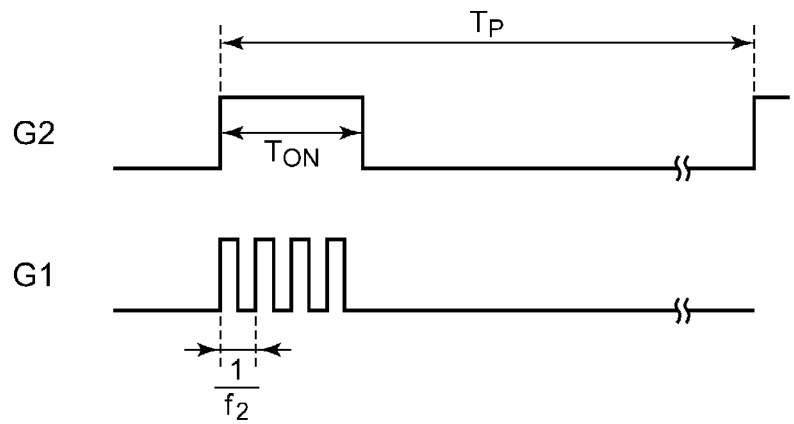

FIGS. 6A and 6B are waveform diagrams each showing the operation of the light-emitting apparatus 3 shown in FIG. 3. FIG. 6A shows a case in which the duty ratio α indicated by the dimming control signal PWMDIM is higher than a predetermined threshold value. In this state, the frequency of the gate pulse signal G1 is set to the first value $f_1$. When the duty ratio of the dimming control signal PWMDIM is higher than the threshold value, the frequency of the gate pulse signal G1 is reduced, thereby providing the control IC 100 with reduced power consumption.

FIG. 6B shows a case in which the duty ratio α indicated by the dimming control signal PWMDIM is lower than a predetermined threshold value. In this state, the frequency of the gate pulse signal G1 is set to the second value $f_2$. In this state, such an arrangement ensures that there are multiple pulses of the gate pulse signal G1 in a short on period $T_{ON}$ of the burst dimming pulse G2. Thus, such an arrangement is capable of stabilizing the output voltage Vout at a suitable value according to the duty ratio of the gate pulse signal G1 adjusted by means of the feedback operation performed according to the detection voltage $V_{R1}$.

Figure 6C:
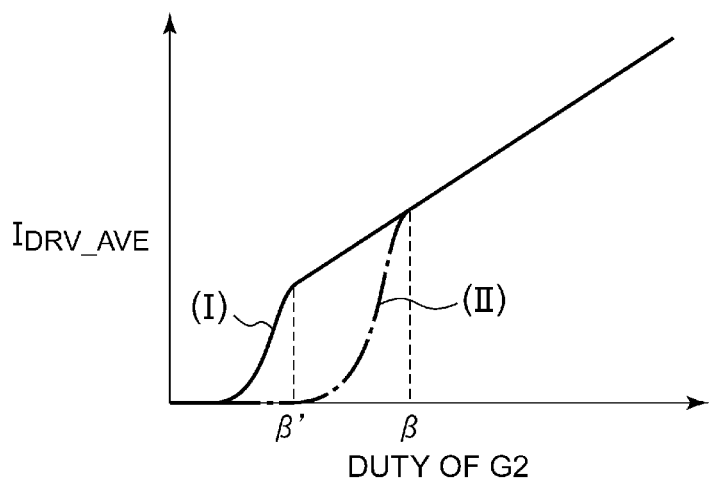
FIG. 6C is a diagram which shows the relation between the duty ratio of the burst dimming pulse and the driving current in the light-emitting apparatus shown in FIG. 3.

FIG. 6C is a diagram which shows the relation between the duty ratio of the burst dimming pulse G2 and the driving current $I_{DRV\_AVE}$ in the light-emitting apparatus 3 shown in FIG. 3. The solid line (I) indicates the average driving current shown in FIG. 3, and the line of dashes and dots indicates the average driving current shown in FIG. 1. As described above, by raising the frequency of the gate pulse signal G1 in a range in which the duty ratio of the burst dimming pulse G2 is low, such an arrangement is capable of adjusting the average driving current $I_{DRV\_AVE}$ according to the duty ratio indicated by the dimming control signal PWMDIM even if the duty ratio is in a low range (ranging between β', and β) which is insufficient for the burst dimming operation of conventional arrangements. That is to say, such an arrangement is capable of driving the LED string 6 at a lower luminance as compared with conventional arrangements.

[Second Embodiment]

Figure 7:
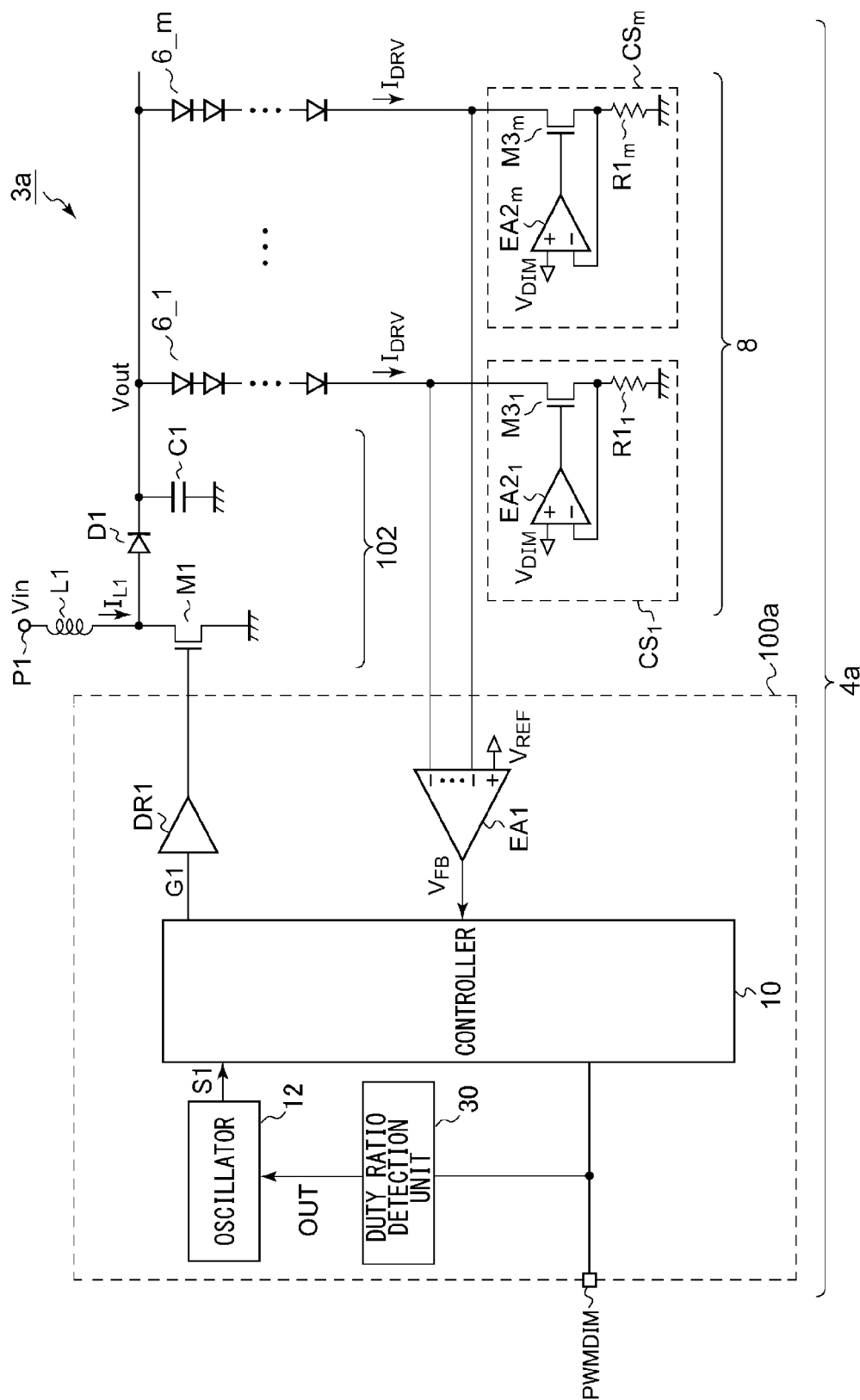
FIG. 7 is a circuit diagram which shows a configuration of a driving circuit according to a second embodiment.

FIG. 7 is a circuit diagram which shows a configuration of a driving circuit 4a according to a second embodiment. The driving circuit 4a is configured to be capable of driving multiple LED strings 6_1 through 6_m, and includes a current driver 8, in addition to the control IC 100a and the output circuit 102.

The current driver 8 includes current sources CS respectively provided to the LED strings 6. Each current source CS includes a transistor M3, a detection resistor R1, and an error amplifier EA2. The transistor M3 and the detection resistor R1 are arranged in series on a path of the corresponding LED string 6. The error amplifier EA2 adjusts the voltage at the control terminal of the transistor M3 such that the voltage drop $V_{R1}$ at the first detection resistor R1 matches the control voltage $V_{DIM}$. Each current source CS stabilizes the driving current $I_{DRV}$ that flows through the corresponding LED string 6 as represented by $I_{DRV}=V_{DIM}/R1$.

The error amplifier EA1 generates a feedback voltage $V_{FB}$ that corresponds to the difference between a predetermined reference voltage $V_{REF}$ and the sum total of the voltage drop that occurs at the transistor M3 and the voltage drop that occurs at the first detection resistor R1, i.e., the cathode voltage of the LED string 6. The error amplifier EA1 includes multiple inverting input terminals respectively configured to receive the cathode voltages of the multiple LED strings 6. The error amplifier EA1 amplifies the difference between the reference voltage $V_{REF}$ and the lowest of the multiple cathode voltages. The controller 10 receives the feedback voltage $V_{FB}$, and generates a gate pulse signal G1 having a duty ratio that is adjusted such that the lowest cathode voltage matches the reference voltage $V_{REF}$.

The operation of the oscillator 12 and the operation of the duty ratio detection unit 30 are the same as those of the driving circuit 4 shown in FIG. 3.

The above is the configuration of the driving circuit 4a. The driving circuit 4a is capable of driving the LED strings 6 at at a lower luminance compared with conventional arrangements, in the same way as with the driving circuit 4 shown in FIG. 3.

Description has been made with reference to the embodiments regarding the present invention. The above-described embodiments have been described for exemplary purposes only, and are by no means intended to be interpreted restrictively. Rather, various modifications may be made by making various combinations of the aforementioned components or processes. Description will be made below regarding such modifications.

Description has been made regarding an arrangement in which the frequency of the gate pulse signal G1 is switched between two discrete values $f_1$ and $f_2$. However, the present invention is not restricted to such an arrangement. Also, the frequency of the gate pulse signal G1 may be switched between three or more discrete values. Also, the frequency of the gate pulse signal G1 may be changed in a continuous range.

Description has been made in the embodiment regarding an arrangement in which the dimming control signal PWMDIM is configured as a pulse signal. However, the present invention is not restricted to such an arrangement. For example, the dimming control signal PWMDIM may be configured as an analog voltage having a voltage level which indicates the duty ratio of the burst dimming pulse G2. With such an arrangement, the duty ratio detection unit 30 can be configured as an analog voltage comparator configured to compare the voltage level of the dimming control signal PWMDIM with the voltages $V_{TH1}$ and $V_{TH2}$ which each correspond to threshold values.

Description has been made in the embodiments regarding a non-insulated switching power supply employing an inductor. Also, the present invention can be applied to an insulated switching power supply employing a transformer.

Description has been made regarding an electronic device as an application of the light-emitting apparatus 3. However, the usage of the present invention is not restricted in particular. Also, the present invention can be applied to an illumination device and so forth.

The settings of the logical signals, such as the high-level state and the low-level state of the logical signals, have been described in the present embodiments for exemplary purposes only. The settings can be freely modified by inverting the signals using inverters or the like.

Description has been made regarding the present invention with reference to the embodiment using specific terms. However, the above-described embodiments show only the mechanisms and applications of the present invention for exemplary purposes only, and are by no means intended to be interpreted restrictively. Rather, various modifications and various changes in the layout can be made without departing from the spirit and scope of the present invention defined in appended claims.

The invention claimed is:

1. A driving circuit configured to supply a driving voltage and a driving current to a light-emitting element, the driving circuit comprising:
    a current source arranged on a path of the light-emitting element;
    a controller configured to generate a gate pulse signal having a duty ratio that is adjusted such that voltage drop across the current source matches a predetermined reference voltage, to receive a dimming control signal which indicates the duty ratio of the burst dimming, and to generate a burst dimming pulse according to the dimming control signal;
    a first driver configured to drive, according to the gate pulse signal, a switching power supply configured to generate the driving voltage;
    a second driver configured to switch the state according to the burst dimming pulse between a state in which a path of the driving current is connected and a state in which the path of the driving current is disconnected; and
    a duty ratio detection unit configured to control the frequency of the gate pulse signal according to the duty ratio indicated by the dimming control signal, wherein the dimming pulse signal is pulse modulated such that the frequency and the duty ratio thereof respectively indicate the frequency and the duty ratio of the burst dimming operation,
    and wherein the duty ratio detection unit comprises:
        a capacitor arranged such that one end thereof is set to a fixed electric potential;
        a first current source configured to charge the capacitor;
        a second current source configured to be switchable between an on state and an off state according to the dimming control signal, and to generate a current that is K times (K represents a real number which is greater than 1) that of the first current source in the on state so as to discharge the capacitor; and
        a comparator configured to compare a voltage that develops at the capacitor with a predetermined threshold voltage.

2. The driving circuit according to claim 1, wherein the duty ratio detection unit is configured to raise the frequency of the gate pulse signal as the duty ratio becomes lower.

3. A driving circuit according to claim 1, wherein the comparator is configured as a hysteresis comparator.

4. A light-emitting apparatus comprising:
    a light-emitting element; and
    a driving circuit according to claim 1, configured to drive the light-emitting element.

5. An electronic device comprising:
    a liquid crystal panel; and
    a light-emitting apparatus according to claim 4, arranged as a backlight of the liquid crystal panel.

6. A driving circuit configured to supply a driving voltage and a driving current to a light-emitting element, the driving circuit comprising:
    a current source arranged on a path of the light-emitting element;
    a controller configured to generate a gate pulse signal having a duty ratio that is adjusted such that voltage drop across the current source matches a predetermined reference voltage, to receive a dimming control signal which indicates the duty ratio of the burst dimming, and to generate a burst dimming pulse according to the dimming control signal;
    a first driver configured to drive, according to the gate pulse signal, a switching power supply configured to generate the driving voltage;
    a second driver configured to switch the state according to the burst dimming pulse between a state in which a path of the driving current is connected and a state in which the path of the driving current is disconnected; and
    a duty ratio detection unit configured to control the frequency of the gate pulse signal according to the duty ratio indicated by the dimming control signal,
    wherein the dimming control signal is pulse modulated such that the frequency and the duty ratio thereof respectively indicate the frequency and the duty ratio of the burst dimming operation,
    and wherein the duty ratio detection unit comprises:
        a counter configured to change its count value by a first value in a first direction for every edge timing of a predetermined clock signal when the dimming control signal is high level, and to change its count value by a second value in a second direction for every edge timing of a predetermined clock signal when the dimming control signal is low level; and a digital comparator configured to compare the count value with a predetermined threshold value.

7. The driving circuit according to claim 6, wherein the digital comparator is configured as a hysteresis comparator.

8. A light-emitting apparatus comprising:
a light-emitting element; and
a driving circuit according to claim 6, configured to drive the light-emitting element.

9. An electronic device comprising:
a liquid crystal panel; and
a light-emitting apparatus according to claim 8, arranged as a backlight of the liquid crystal panel.

* * * * *